Nov. 13, 1962

J. W. HARDY 3,064,144

BIPOLAR INTEGRATOR WITH DIODE BUDGE DISCHARGING CIRCUIT FOR PERIODIC ZERO RESET

Filed May 23, 1960

WITNESSES:
Leon M. Garman
James F. Young

INVENTOR
John W. Hardy
BY V. W. Cleary
ATTORNEY 3,064,144
Patented Nov. 13, 1962

3,064,144

BIPOLAR INTEGRATOR WITH DIODE BRIDGE DISCHARGING CIRCUIT FOR PERIODIC ZERO RESET

John W. Hardy, Linthicum Heights, Md., assignor to Westinghouse Electric Corporation, East Pittsburgh, Pa., a corporation of Pennsylvania Filed May 23, 1960, Ser. No. 31,022
8 Claims. (Cl. 307—88.5)

This invention relates to electrical integrating circuits, and more particularly, but not exclusively, to an integrator for integrating bipolar signals.

Two circuits commonly employed for integration are the Miller integrator and the Bootstrap integrator. The vacuum tube version of these two integrators are illustrated in "Waveforms", pages 662–664, in the Radiation Laboratories Series, McGraw-Hill Book Company, Inc., 1949. When transistors are employed in a Miller integrator, capacitive feedback is applied from the collector (one of the output terminals) to the base. The feedback current in this circuit arrangement can be defined by $$C\times\frac{dv_o}{dt}$$

If the amplifier is of high gain, the output voltage $v_o$ is the integral of the input voltage. When D.C. coupling is employed between the integrator and the succeeding circuit the quiescent output D.C. voltage depends on the transistor collector current, and as such is liable to drift.

A rearrangement of the Miller circuit gives the Bootstrap circuit. Both the Miller integrator and the Bootstrap integrator are at a disadvantage when positive and negative voltages are to be integrated and the integrator is to be reset or the output discharged. The disadvantage in these two circuits is because the transistor must be biased into the active region giving the integrating capacitor a residual charge. At the end of the integration period, the charge on the integrating capacitor must be changed rapidly to its quiescent value, and this becomes more and more diffcult as the size of the capacitor employed increases.

Accordingly, an object of the invention is a circuit which will efficiently and accurately provide an output signal which is the integral of a bipolar input signal.

Another object of the invention is to provide an electrical integrating circuit wherein the quiescent output voltage is zero so that the integration of the input signal starts at ground potential.

Still another object of the invention is the provision of an electrical integrator which can be accurately reset to zero output at a predetermined or selected time.

A still further object of the invention is to provide an integrating circuit which can accurately and efficiently integrate either A.C. or D.C. signals.

A further object of the invention is the provision of an integrating circuit wherein no adjustments are required to balance the circuit.

Another object of the invention is the provision of an integrating circuit which will integrate efficiently and accurately either A.C. or D.C. and can be reset to zero output at a predetermined time.

These and other objects and advantages of the present invention will become more apparent by referring to the accompanying detailed description and drawings, in which like numerals indicate like parts, and in which.

Figure 1:
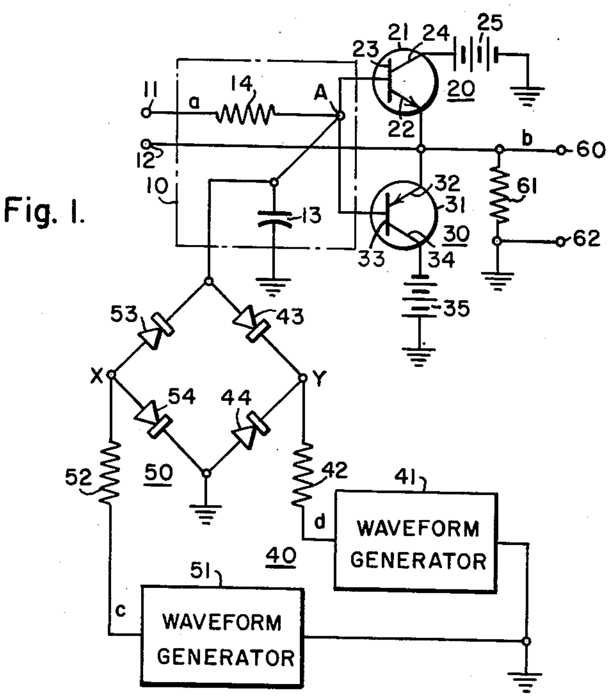
FIG. 1 illustrates a schematic diagram of an embodiment of the invention.

The embodiment of the invention illustrated in FIG.

1 includes an integrating means comprising an integrating network 10, a first amplifying means 20, and a second amplifier 30. The amplifiers 20 and 30 are of the emitter follower type and in the quiescent state are not conducting. Depending upon the polarity of the input signal applied to the integrating network 10, either the amplifier 20 or the amplifier 30 will be rendered conductive to provide an output signal. The integrating network 10 includes an integrating capacitor 13 which is charged by the input signal to thereby apply the integrated input signal to the amplifiers 20 and 30. Feedback is applied from the output of amplifiers 20 and 30 to the input of network 10 to make the integration linear. First and second directional discharge paths 40 and 50 are provided across the capacitor 13 for discharging the capacitor at a predetermined time, so as to reset the output of the integrator to zero. The discharge paths 40 and 50 are rendered nonducting by waveform generators 41 and 51, within these paths, while the signal is being integrated. The capacitor 13 will discharge at the predetermined time through one of the discharge paths 40 and 50 dependent upon the polarity of the input signal applied to the network 10. This is accomplished by the potential of the generators 41 and 51 being reversed so as to allow discharge of the capacitor 13 through the appropriate discharge path. Points of reference potential, X and Y and the discharge paths 50 and 40, are connected to ground through unidirectional current devices so as to prevent an overswing of the discharge of the capacitor beyond ground potential.

The amplifiers 20 and 30 employ transistors of the opposite conductivity type so that in quiescent state when the input voltage is zero, both transistors will be cutoff. The only current flowing through the load resistance is the sum of the collector leakage currents through the transistors. If the transistors have similar characteristics then these currents cancel resulting in a zero output voltage. Further, the integrator will be reset to zero in a minimum of time due to the low resistance of the diodes in the discharge paths 40 and 50. The discharge of the capacitor 13 will not be allowed to swing beyond the reference or ground potential due to the reference points X and Y being connected through diodes to ground. By this circuit arrangement, the integrating circuit enables integration of input signals with a minimum of reset time for the integrator and without overswing of the integrator immediately following reset. Further, these features and this circuit arrangement enables the integration of either D.C. or A.C. signals with accuracy.

The embodiment of the invention illustrated in FIG. 1 more specifically includes an integrating means including an integrating network 10 and first and second amplifiers 20 and 30. The integrating network 10 has two input terminals 11 and 12 to which the input signal is applied for integration. The first amplifier 20 includes an N-P-N type transistor 21 having an emitter 22, a base 23 and a collector 24 with a D.C. collector voltage supply 25 connected between the collector 24 and ground potential. The second amplifier means 30 comprises a P-N-P type transistor 31 having an emitter 32, a base 33 and a collector 34. A collector D.C. voltage supply 35 is connected between the collector 34 and ground potential. The output of the emitter follower amplifiers 20 and 30 is applied to the output terminal 60 across the load resistance 61 with the emitters 22 and 32 being connected together as are the base electrodes 23 and 33.

The integrator network 10 includes input terminals 11 and 12 to which the input signal to be integrated is applied. A resistor 14 is connected between one of the input terminals 11 and the common base connection between the base electrodes 23 and 33. An integrating reactance in the form of a capacitor 13 is connected between the common connection A of the bases 23 and 33, and ground so as to apply an integrated signal to the bases of the transistors 21 and 31. Feedback is applied from the output terminal 60 to the other input terminal 12. Dependent upon the polarity of the input signal, either the transistor 21 or 31 will be rendered conductive so as to provide an output signal at the output terminal 60.

When a positive input voltage is applied between the input terminals 11 and 12, the transistor 21 will conduct and the integrating capacitor 13 will be charged so as to provide an integrated output signal at the output terminals. During the integration of the input signal, the discharge paths 40 and 50 will be rendered nonconductive by waveform generators 41 and 51 respectively, regardless of whether the input signal is positive or negative. At a predetermined time the discharge path 40 will be rendered conductive so as to discharge the capacitor 13 if the input signal is positive going and at the same time the discharge path 50 will be rendered conductive to discharge the capacitor 13 if the input signal is negative going.

The first discharge path 40 comprises a diode 43 which is connected between the common base point A and a point of reference potential Y. A current limiting resistor 42 is connected between the point of reference potential Y and a waveform generator 41 which is connected between the resistor 42 and ground potential. A damping diode 44 is connected between the reference potential point Y and ground potential.

The second discharge path 50 includes a diode 53 which is connected between the common base point A and a second point of reference potential X. The polarity of the diode 53 is opposite to the polarity of the diode 43 so that the second discharge path 50 will conduct only current of opposite polarity to the current which will pass through the first discharge path 40. The second discharge path further includes a resistor 52 with a waveform generator 51 connected between the resistor 52 and ground potential. Another clamping diode 54 is connected between the second point of reference potential X and ground potential. The clamping diode 54 is of the opposite polarity as relative to ground as is the clamping diode 44.

Figure 2:
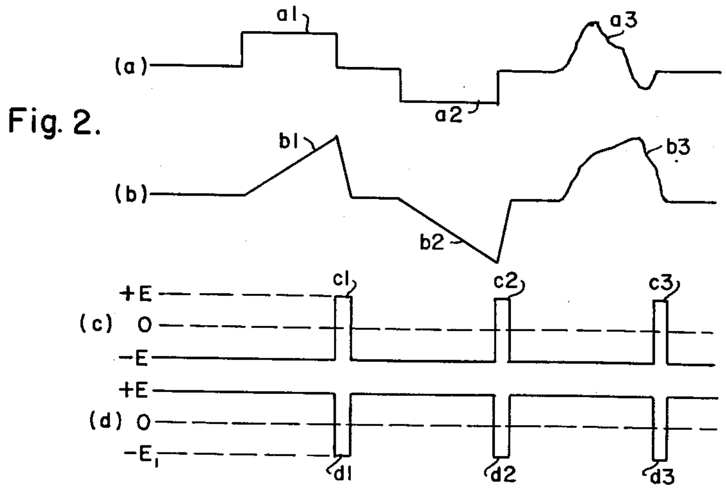
FIG. 2 illustrates waveforms useful in explaining the embodiment of the invention illustrated in FIG. 1.

The output of the waveform generator 41 is illustrated in curve (*d*) of FIG. 2 whereas the output of the waveform generator 51 is illustrated in curve (*c*) of FIG. 2.

Since the amplifiers 20 and 30 operate as emitter followers, having a gain A slightly less than unity, then the output voltage $V_o$ after time $t$ is defined by the following equation:

$$V_o=\frac{AV}{(1-A)+K}\left(1-e^{\frac{-t((1-A)+K)}{CR}}\right)$$

where $V$=input voltage $$K=\frac{R}{Ri}$$

$R$=resistance of resistor 14

$Ri$=input (base) resistance of the transitor

If $$t\ll\frac{CR}{(1-A)+K}$$

then the equation can be simplified to $$V_o\frac{AVt}{CR}\left(1-\frac{t((1-A)+K)}{2CR}\right)$$

Hence, employing this simplified equation the second term in parentheses is the measure of the non-linearity of the integration. Hence, it is desirable to make A as near as possible to unity, and K as small as possible. The operation of the integrating circuit will now be described.

Curve (*a*) of FIG. 2 illustrates an example of an input signal to be applied to the input terminals 11 and 12 to be integrated. Curve (*b*) illustrates the integrated output signal appearing at the output terminal 60 after integration by the integrating circuit. If the input signal is positive, as illustrated by waveform *a*1 in curve (*a*), the integrated output will appear as waveform *b*1 as shown in curve (*b*). During the integration of this signal, the first discharge path 40 will be rendered nonconductive by the waveform generator 41 maintaining the point of reference potential Y above ground potential, shown in curve (*d*) in FIG. 2. The second discharge path 50 will be rendered nonconductive by the output of the waveform generator 51, shown in curve (*c*) of FIG. 2, which maintains the point of reference potential X below ground potential to prevent conduction through diode 53. It will be noted that the output of the waveform generators 41 and 51, during integration, must have a potential sufficiently greater than the input signal in order to bias diodes 43 and 53 sufficiently to effect nonconduction of the discharge paths 40 and 50.

As shown in curves (*c*) and (*d*) in FIG. 2, after a predetermined time, or selectively or periodically, the potential output of waveform generator 41 drops from +E1 to −E1 to produce a negative going pulse illustrated as *d*1 in curve (*d*) of FIG. 2. This renders the discharge path 40 conductive to discharge the integrating capacitor 13 after a positive voltage has been applied between input terminals 11 and 12. As shown in curve (*d*) of FIG. 2, the negative going pulse *d*1 forward biases the diode 43 so as to discharge the capacitor 13 after the integrated waveform *a*1 has been applied to the input terminals. The clamping diode 44 clamps the reference point Y to ground so as to prevent the discharge of the capacitor swinging negative beyond ground potential.

If the signal being applied between input terminals 11 and 12 is negative, as waveform *a*2 in curve (*a*) of FIG. 2, the discharge path 50 will be effective at a predetermined time to discharge the capacitor 13. As illustrated in curve (*c*) of FIG. 2 at a predetermined time the waveform generator 51 will switch from −E to +E volts to effect a positive going pulse *c*1 and subsequently pulses C2 and C3. When a negative going waveform, such as *a*2 is applied to the input terminals the pulse *c*2 will be effective to forward bias the diode 53 and hence render the discharge path 50 conductive to discharge the integrating impedance or capacitor 13. The pulse *c*1, *c*2 and *c*3 occur at the same time as pulses *d*1, *d*2 and *d*3 respectively. A clamping diode 54 is employed between the reference potential point X and ground so as to prevent the discharge capacitor from swinging positive above ground potential after the integrator has been completely reset to zero.

Waveform *a*3 indicates an A.C. waveform applied to the input terminals that will effect an output shown as waveform *b*3 which is an accurate integrated output of the input waveform *a*3.

While the embodiment disclosed in the preceding specification is preferred, other modifications will be apparent to those skilled in the art which do not depart from the scope of the broadest aspects of the present invention.

I claim as my invention:

1. An integrating circuit comprising an integrator having input terminals for receiving a signal to be integrated, and a pair of output terminals, said integrating means havng an integrating impedance, a first discharge path for selectively discharging said integrating impedance when the charge on said impedance is of a predetermined polarity including a unidirectional current device and bias means for selectively biasing said unidirectional current device, a second discharge path for selectively discharging said integrating impedance when said integrating impedance has a charge of opposite polarity including another unidirectional current device and another bias means for selectively biasing said other unidirectional current device.

2. An integrating circuit comprising an integrating network having an integrating impedance for integrating a bipolar signal applied thereto, a first and a second transistor of the opposite conductivity type, means for applying the output of said integrating network to said first and second transistors, a first discharge path for selectively discharging said integrating impedance when the input signal is of a predetermined polarity including a first unidirectional current device and first bias means for selectively biasing said first unidirectional current device, a second discharge path for selectively discharging said integrating impedance when the input signal is of an opposite polarity including a second unidirectional current device and another bias means for selectively biasing said second unidirectional current device.

3. An integrating circuit for a bipolar signal applied thereto, comprising, in combination; a first amplifier and a second amplifier; means for selectively rendering said first and said second amplifier conductive in response to a predetermined polarity of input signal; integrating means responsive to said input signal for charging said integrating means to apply an integrated input signal to said first and said second amplifier; and first and second directional discharge paths each responsibe to a respective polarity of the input signal for discharging said integrating means at a predetermined time to reset same.

4. An integrating circuit for a bipolar signal applied thereto, comprising, in combination; a first amplifier and a second amplifier; means for selectively rendering said first and said second amplifier conductive in response to a predetermined polarity of input signal; integrating means responsive to said input signal for applying an integrated input signal to said first and second amplifier; first and second directional discharge paths each responsive to a respective polarity of the input signal for discharging said integrating means to reset the output of said integrator; and means for rendering said discharge paths non conducting while the input signal is being integrated.

5. An integrating circuit for a bipolar signal applied thereto, comprising, in combination; a first amplifier and a second amplifier; means for selectively rendering said first and said second amplifier conductive in response to a predetermined polarity of input signal; integrating means responsive to said input signal for charging in order to apply an integrated input signal to said first and said second amplifier; first and second directional discharge paths each responsive to a respective polarity of the input signal for discharging said integrating means; means for limiting discharge of said integrating means to a reference level; and means for rendering said discharge paths non-conducting while the input signal is being integrated.

6. An integrating circuit for a bipolar signal applied thereto, comprising, in combination; a first amplifier and a second amplifier; means for selectively rendering said first and said second amplifier conductive in response to a predetermined polarity of input signal; integrating means responsive to said input signal for charging, to apply an integrated input signal to said first and said second amplifier; means for discharging said integrating means to a reference level after a predetermined time; said last mentioned means including a discharge path for each polarity of charge of said integrating means.

7. An integrator circuit for a bipolar signal applied thereto, comprising, in combination; a first amplifier and a second amplifier; means for selectively rendering said first and said second amplifier conductive in response to a predetermined polarity of input signal; charging means responsive to said input signal for applying an integrated input signal to said first amplifier and said second amplifier; first and second directional discharge paths each responsive to a respective polarity of the input signal for discharging said charging means at a predetermined time to reset said charging means; means for rendering said discharge paths non-conducting while the input signal is being integrated; each said discharge path including a unidirectional current device oppositely poled; each said discharge path having a reference potential point; and a first and a second waveform generator for selectively maintaining the reference potential point of said first and said second discharge paths above and below ground potential respectively and after said predetermined time rendering said discharge paths conductive thereby discharging said charging means in accordance with the polarity of the input signal.

8. An integrating circuit for a bipolar signal applied thereto, comprising, in combination; a first amplifier including a semiconductor device of predetermined conductivity type; a second amplifier including a semiconductor device of opposite semiconductivity type; output means operably connected to said first and said second amplifier for providing an amplified output having a polarity responsive to the conductive state of said amplifiers; input means; means for selectively rendering said first amplifier and said second amplifier conductive in response to a predetermined polarity of input signal to said input means; integrating means responsive to said input signal for charging to apply an integrated input signal to said first amplifier and said second amplifier; feedback means operably connected between said output means and said input means for limiting said integrated input signal to a linear representation; and a first directional discharge path and a second directional discharge path each responsive to a respective polarity of the input signal for discharging said integrated input signal of the integrating means to zero.

References Cited in the file of this patent

UNITED STATES PATENTS

| | | |
|---|---|---|
| 2,719,225 | Morris | Sept. 27, 1955 |
| 2,721,308 | Levy | Oct. 18, 1955 |
| 2,860,260 | Sykes | Nov. 11, 1958 |
| 2,863,123 | Koch | Dec. 2, 1958 |
| 2,864,961 | Lohman | Dec. 16, 1958 |
| 2,874,284 | Conger | Feb. 17, 1959 |

UNITED STATES PATENT OFFICE

CERTIFICATE OF CORRECTION

Patent No. 3,064,144

November 13, 1962

John W. Hardy

It is hereby certified that error appears in the above numbered patent requiring correction and that the said Letters Patent should read as corrected below.

In the heading to the drawings, title of invention, for "BUDGE" read -- BRIDGE --.

Signed and sealed this 2nd day of July 1963.

(SEAL)
Attest:

ERNEST W. SWIDER
Attesting Officer

DAVID L. LADD
Commissioner of Patents